United States Patent [19]

Luscher

[11] 4,111,379
[45] Sep. 5, 1978

[54] CASSETTE FOR STRIP MATERIAL

[75] Inventor: René Lüscher, Regensdorf, Switzerland

[73] Assignee: Gretag Aktiengesellschaft, Regensdorf, Switzerland

[21] Appl. No.: 784,856

[22] Filed: Apr. 5, 1977

[30] Foreign Application Priority Data

Apr. 13, 1976 [CH] Switzerland .......................... 4675/76

[51] Int. Cl.² .......................... G03B 1/04; B65H 75/18
[52] U.S. Cl. .................................. 242/71.1; 242/72.1; 242/68.3
[58] Field of Search ...................... 242/71.1, 71.7, 195, 242/197, 198, 68.3, 72.1; 352/72, 73, 74, 75, 76, 77

[56] References Cited

U.S. PATENT DOCUMENTS

| | | | |
|---|---|---|---|
| 2,469,008 | 5/1949 | Simmon | 242/71.1 X |
| 2,943,805 | 7/1960 | Loewe | 242/198 |
| 3,027,111 | 3/1962 | Redfield | 242/198 |
| 3,124,319 | 3/1964 | Cohen | 242/72.1 |
| 3,544,027 | 12/1970 | Green | 242/68.3 |
| 3,549,106 | 12/1970 | Stark | 242/197 |
| 3,807,840 | 4/1974 | Cook | 352/72 |
| 4,004,752 | 1/1977 | Kamaya | 242/198 |

*Primary Examiner*—Edward J. McCarthy
*Attorney, Agent, or Firm*—Burns, Doane, Swecker & Mathis

[57] ABSTRACT

A cassette for feeding unexposed photographic film to or receiving exposed film for an automatic printer. The cassette having a light tight casing in which is a hub for receiving either a spool of unexposed film or taking up exposed film fed to it through the opening in the casing. The hub is mounted on a shaft which extends from the casing and carries a brake disc engageable with a brake band mounted inside the casing and a slider which is disposed outside the casing. The shaft is rotatably mounted in a plate movable within the casing to disengage the brake disc from the brake band when the slider on the shaft engages guide bars on the delivery side of the printer. Flaps are provided inside the casing which pivot to a position about the hub by thrust rods operated by means on the take-up side of the printer to guide exposed film on to the hub which is driven by a drive on the printer engaging a pulley mounted on the shaft adjacent the slider and external to the casing.

15 Claims, 7 Drawing Figures

CASSETTE FOR STRIP MATERIAL

FIELD OF THE INVENTION

This invention relates to a cassette for strip material, particularly but not exclusively to a cassette for photographic strip material.

PRIOR ART

Modern photographic printers often have special cassettes which can be engaged in a light tight manner with the input or output side of a printing station to deliver unexposed printing material to or receive exposed printing material from the printer.

It is conventional practice to use separate cassettes which differ in construction from one another and which are not interchangeable for delivering unexposed and receiving exposed material. Delivery cassettes usually have a rotatable hub on which is mounted a spool containing a roll of unexposed printing material and a weight-dependent brake acting on the hub to keep tension in the strip of material constant during unwinding. Receiving cassettes have either an internal drive for the hub or a special coupling mechanism for providing a connection to an external drive at the printing station.

Using cassettes of different construction for delivery and take-up is inefficient and complex in practice. It is therefore an object of the invention to provide a cassette which can be used both for take-up and delivery.

SUMMARY OF THE INVENTION

In accordance with the present invention therefore we provide a cassette for strip material comprising:

(a) a light tight casing defining an opening through which strip material is admitted to or drawn from the casing, (b) a door in the casing and within the casing, (1) a hub for receiving a spool for strip material.

(2) means rotatably mounting said hub in said casing, (3) means for coupling said mounting means to a drive external to the casing, (4) a brake acting on said hub, and (5) a brake release mechanism adapted to be actuated from outside the casing.

BRIEF DESCRIPTION OF THE DRAWINGS

An embodiment of the invention will now be described in detail with reference to the accompanying drawings, in which:-

DETAILED DESCRIPTION OF PREFERRED EMBODIMENT

Figure 1:
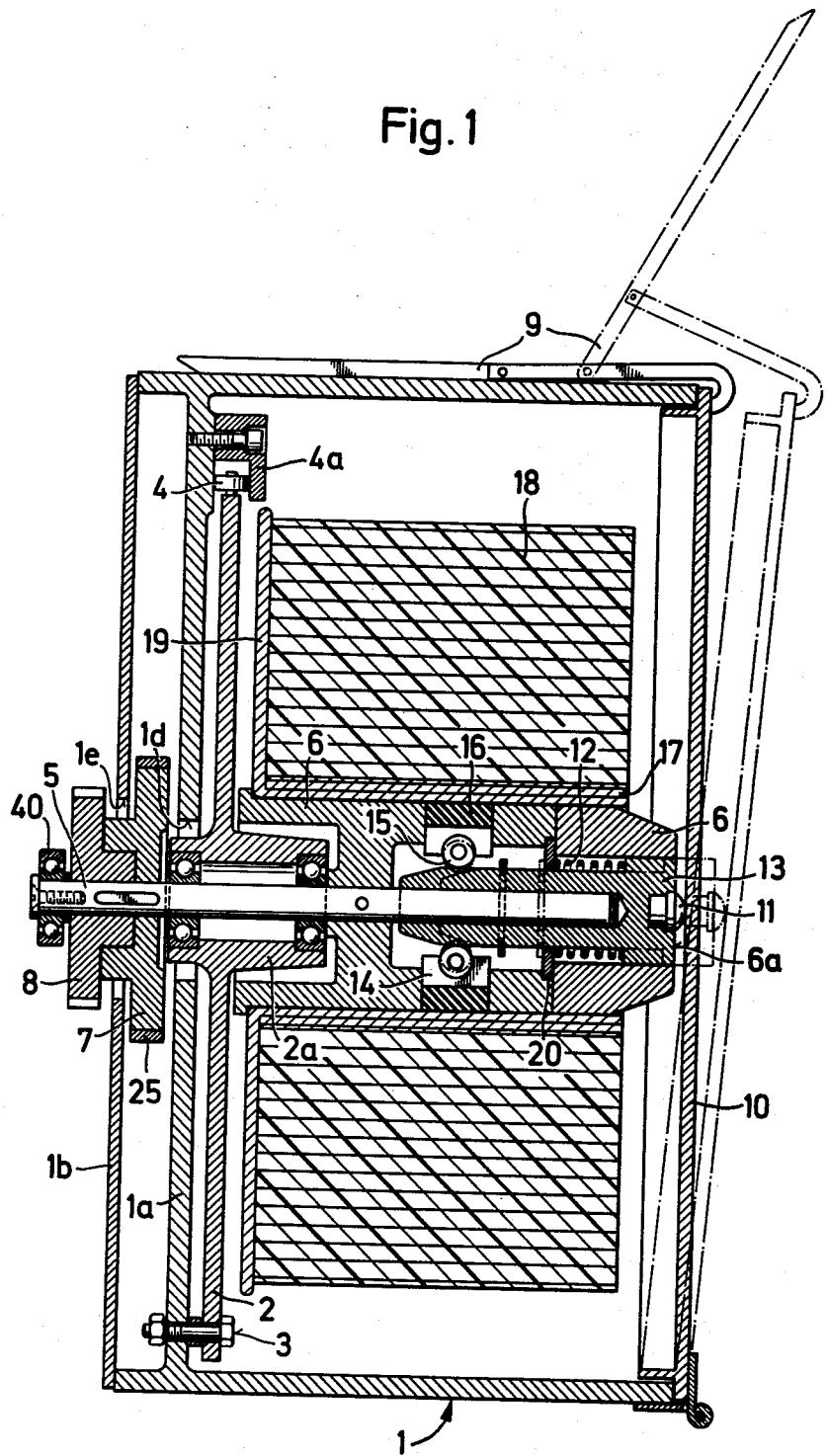
FIG. 1 is a section through a cassette on the line I — I of FIG. 2.
Figure 2:
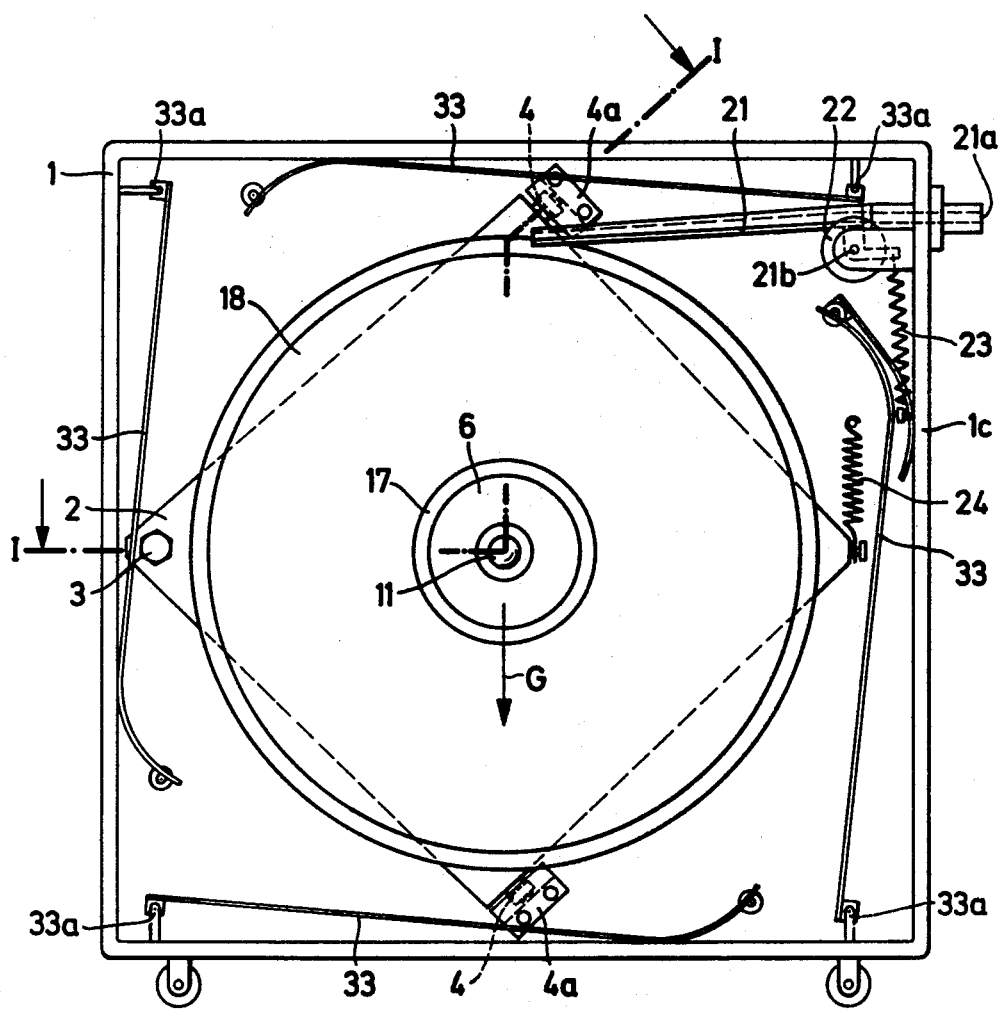
FIG. 2 is a view of the cassette from the cover side but with the cover removed.

The cassette shown in FIG. 1 has an oblong casing 1 with a rigid vertical partition 1a, a rigid outer wall 1b parallel to the partition 1a and, opposite the outer wall 1b, a hingable cover 10 which is held closed by means of a toggle 9. An end wall 1c at right angles to the partition 1a is formed at its top end with an opening 21a through which photographic strip material can be introduced or removed. A rigid support plate 2 is pivotally mounted on the inside of partition 1a on a horizontal pivot 3, the plate 2 having rollers 4 running in guides 4a secured to partition 1a. As can be seen in FIG. 2, the end of the plate 2 remote from the pivot 3 is supported by a load-relieving spring 24.

In the center of plate 2 is a bearing 2a supporting a shaft 5 on which a hollow hub 6 is rotatably mounted. Bearing 2a extends through an aperture 1d in partition 1a into a chamber or space bounded by partition 1a and outer wall 1b. Shaft 5 projects beyond bearing 2a, through another aperture 1e in outer wall 1b. A brake disc 7, a pulley 8 and a ball race 40 are mounted on the projecting portion of shaft 5 for rotation therewith. The outer cage of the ball race 40 can of course rotate freely.

A roll 18 of photographic material comprising a tubular spool 17 is mounted on hub 6, which extends from the plate 2 to the cover 10 of the cassette. A flange 19 on hub 6 locates the roll 18 axially. A radially adjustable clamping member in the form of a closed rubber ring 16 is let into the periphery of the hub 6. Radially movable segments 14 are provided inside the hollow hub 6 to move the clamping member against the spool 17 by means of roller 15 engaging a conical sleeve 13 axially movable inside hub 6. The sleeve 13 is accessible from the open end 6a of hub 6 and is spring-biassed outwardly by a helical spring 12 which bears on an abutment ring 20. When cover 10 is open, sleeve 13 is moved to its outer position by spring 12 thereby causing the ring 16 to urge the segments 14 radially inwards allowing the spool 17 with film roll 18 to move freely on spindle 6. When the cover 10 is being closed, it presses on a contact ball 11 on sleeve 13 moving it inwards; consequently the segments 14 move radially outwards pressing the rubber ring 16 against the spool 17 so that the spool is engaged with the hub 6. When the cover 10 is opened the roll 18 is released automatically from the hub 6.

Hub 6 is coupled by way of the shaft 5 to the brake disc 7 which rotates within a brake band 25 which is secured to partition 1a. Thus the speed at which the roll 18 runs during unwinding can be controlled by the braking action of the band 25 on the brake disc 7. Since the braking action is weight-dependent, therefore, strip tension can be kept at a constant value which is substantially independent of roll diameter. Adjustment of the tension of the strip of photographic material (arrow Z, FIG. 3) within wide limits is possible by appropriate adjustment of spring tension in spring 24. The real weight of the roll 18 and the elements supporting it as well as the weight partially compensated by spring 24 is indicated by arrows G and R, respectively.

When photographic material is wound on to the spool 17 on hub 6, the plate 2 and therefore the brake disc 7 are pivoted upwards slightly to disengage the brake disc from brake band 25 making the brake inoperative. The upwards pivoting is produced by guides 41, 42, shown in FIGS. 6 and 7 mounted on the printer with which the cassette is used. The guides 41, 42 engage the outer cage of the ball race 40 and raises it together with the hub 6 and the brake disc 7 as the cassette is pushed fully home in the printer.

Figure 6:
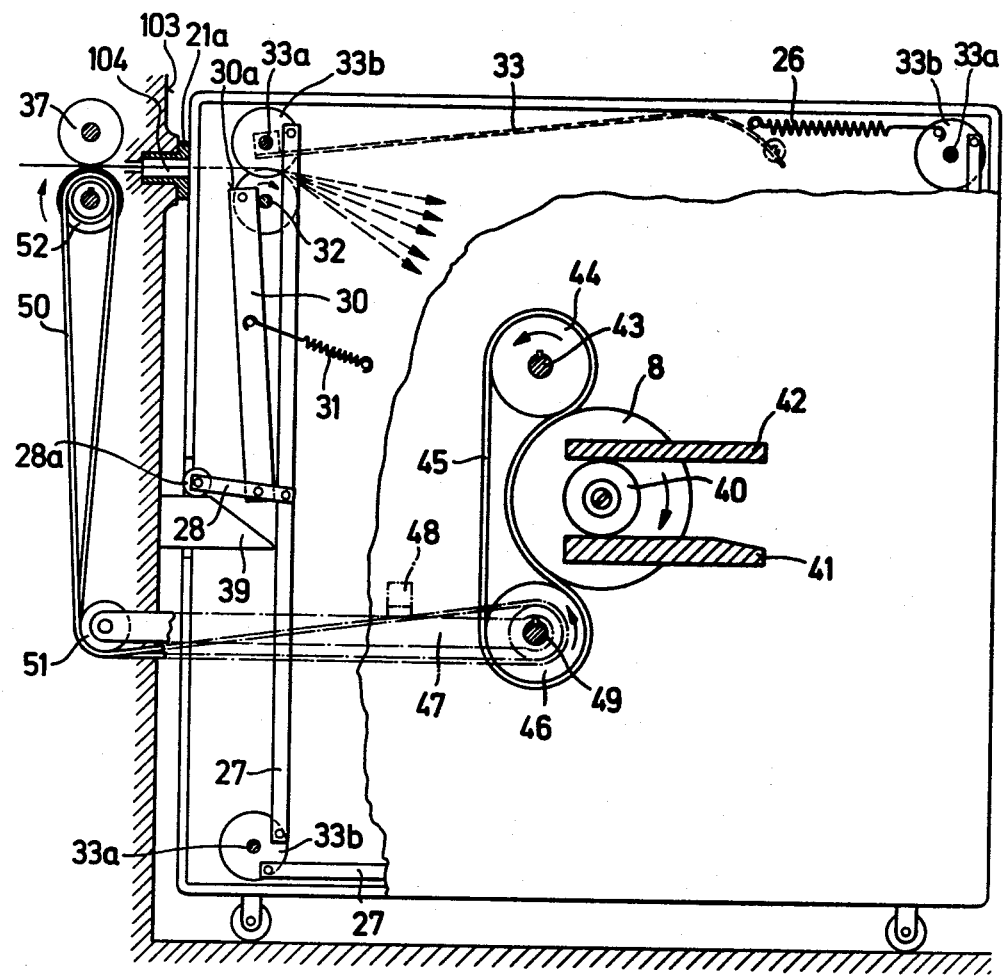
Figure 7:
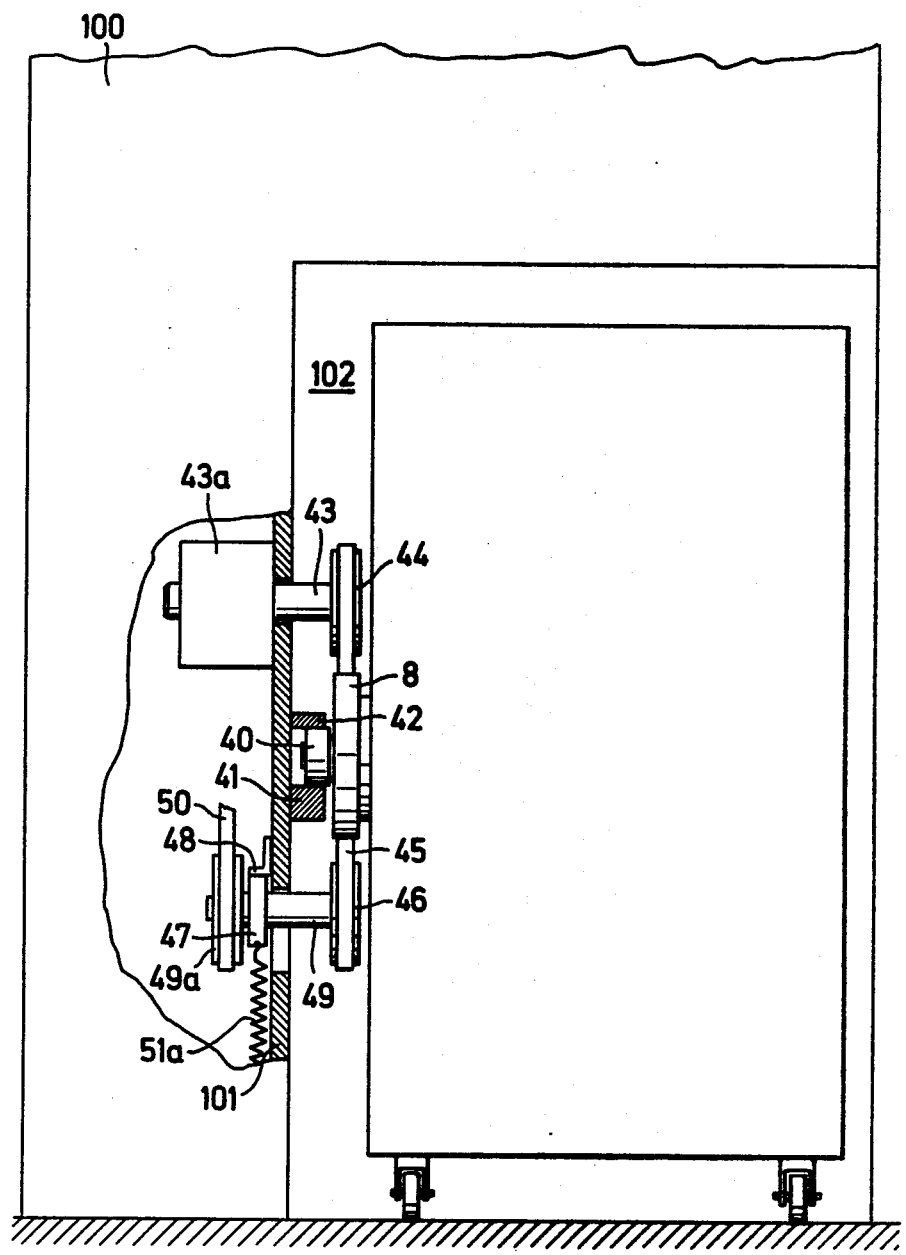
FIG. 7 is a rear view of the cassette inserted in the printer.

FIGS. 6 and 7 also show how the hub 6 is driven when photographic material is fed to the cassette. Two shafts 43, 49 on which are mounted pulleys 44, 46 respectively extend from a side wall 101 of a cassette receiving recess 102 of a printer 100 which is shown in purely diagrammatic form and can be e.g. the EC-3 printer of the Gretag AG, of Regensdorf, Switzerland. The pulleys 44, 46 are interconnected by a toothed belt 45. The top shaft 43 is rotatably mounted in a bearing 43a and the bottom shaft 49 is rotatably mounted on an arm 47 and has on it another pulley 49a. Shaft 43 is driven by a motor (not shown). Arm 47 is mounted to pivot vertically around the horizontal axis of rotation of deflecting roller 51 and is biassed downwardly by a spring 51a. The pivoting motion of arm 47 is limited in the upwards direction by an abutment 48 and in the downwards direction by the length of the toothed belt 45 (FIG. 6) which extends part way around the pulley 8 thus transmitting motion thereto.

End wall 103 of recess 102 has an opening 104 for the photographic material strip which is to be conveyed from the printer into the cassette. Before the opening 104 is a pair of rollers 37 which serve to guide and drive the photographic material strip. The bottom roller of the two rollers 37 is braked slightly by a brake 36 so as to impart tension (arrow B, FIG. 5) in the film strip at the beginning of winding-on. The bottom roller is further connected by a free wheel clutch to a pulley 52 driven from shaft 43 via toothed belt 45, pulley 49a, and a belt 50 running over deflecting roller 51.

The cassette is also provided with means for automatically feeding the leading edge of the strip of printing material onto the spool, so as to avoid opening the cassette. Basically, the feed means comprise four guide flaps 33 one at each corner of the cassette casing, arranged to pivot around horizontal pivots 33a.

Figure 4:
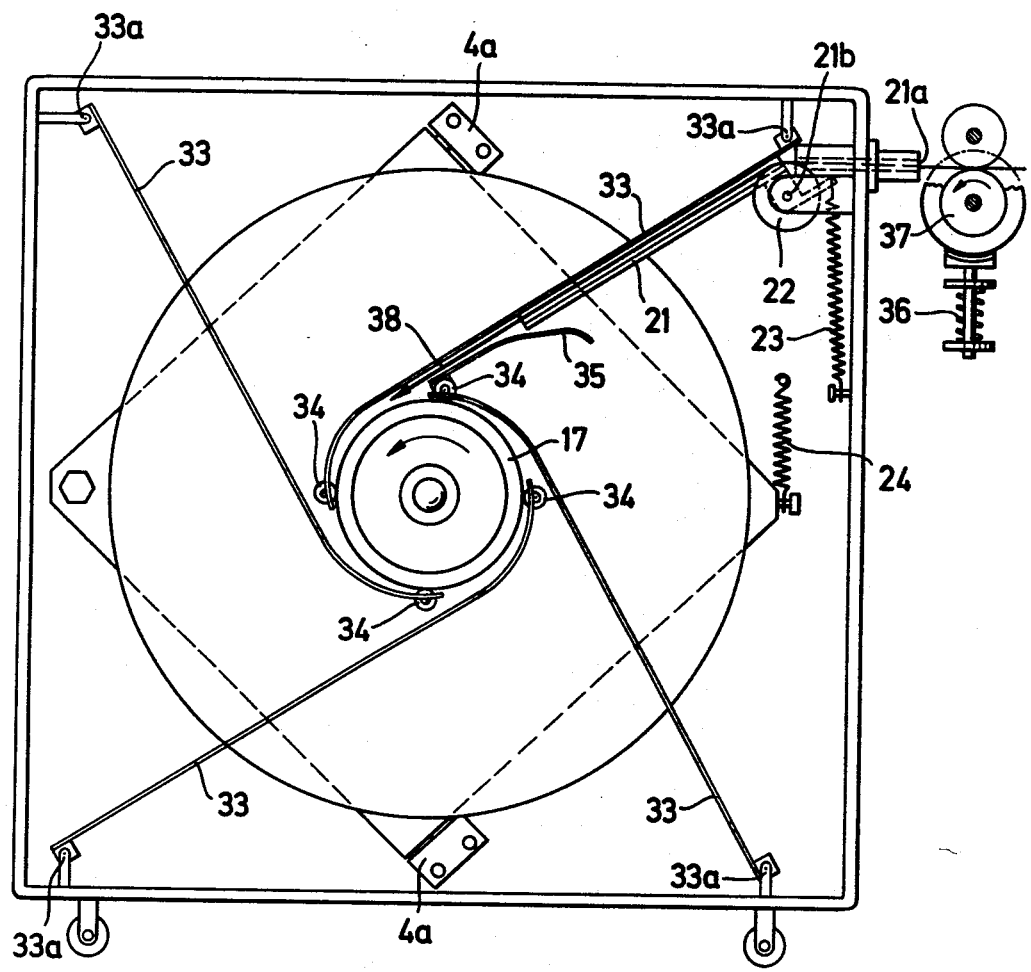
FIGS. 4 to 6 are views similar to FIGS. 2 and 3 but showing various phases of connection to a printer.
Figure 5:
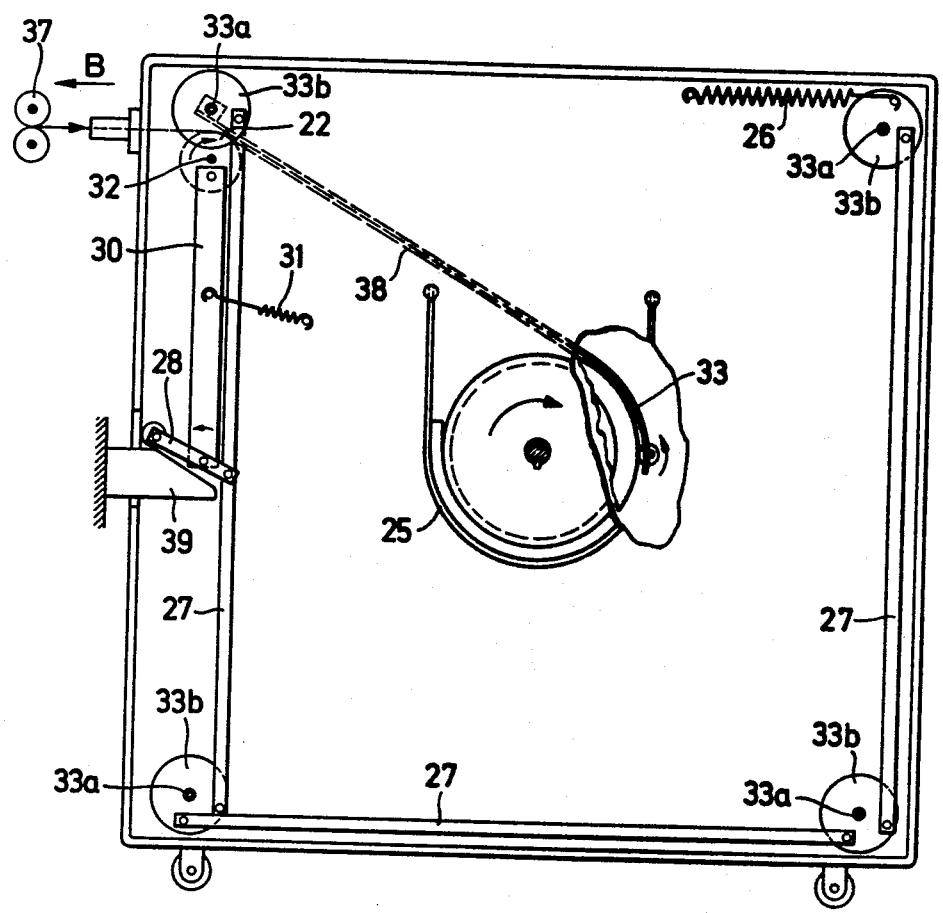

The flaps 33 are interconnected by three thrust rods 27 and four crank discs 33b and are retained in an inoperative position by a restoring spring 26 as shown in FIGS. 5 and 6. In the inoperative position, each flap 33 is in engagement with a wall of the cassette casing as shown in FIG. 2. When the rods 27 are moved into the operative position, the flaps 33 are caused to pivot inwardly, their curved free ends engaging the periphery of hub 6 or the spool 17 thereon, as shown in FIG. 4. Rollers 34 are mounted on the free ends of the flaps 33.

A guide bar 21, which in cross-section is substantially U-shaped, is pivotally mounted, adjacent the opening 21a in the end wall of the cassette casing. The bar 21 is pivotable around a pivot 21b and is retained by a spring 23 in an initial substantially horizontal position, as shown in FIG. 2. A deflecting roller 22 (FIG. 2) is rotatably mounted on pivot 21b but freely rotatable relatively to the guide bar 21 and a cam roller 32 visible in FIG. 5 rotates with the deflecting roller 22. An auxiliary flap 35 prolonges guide bar 21.

Figure 3:
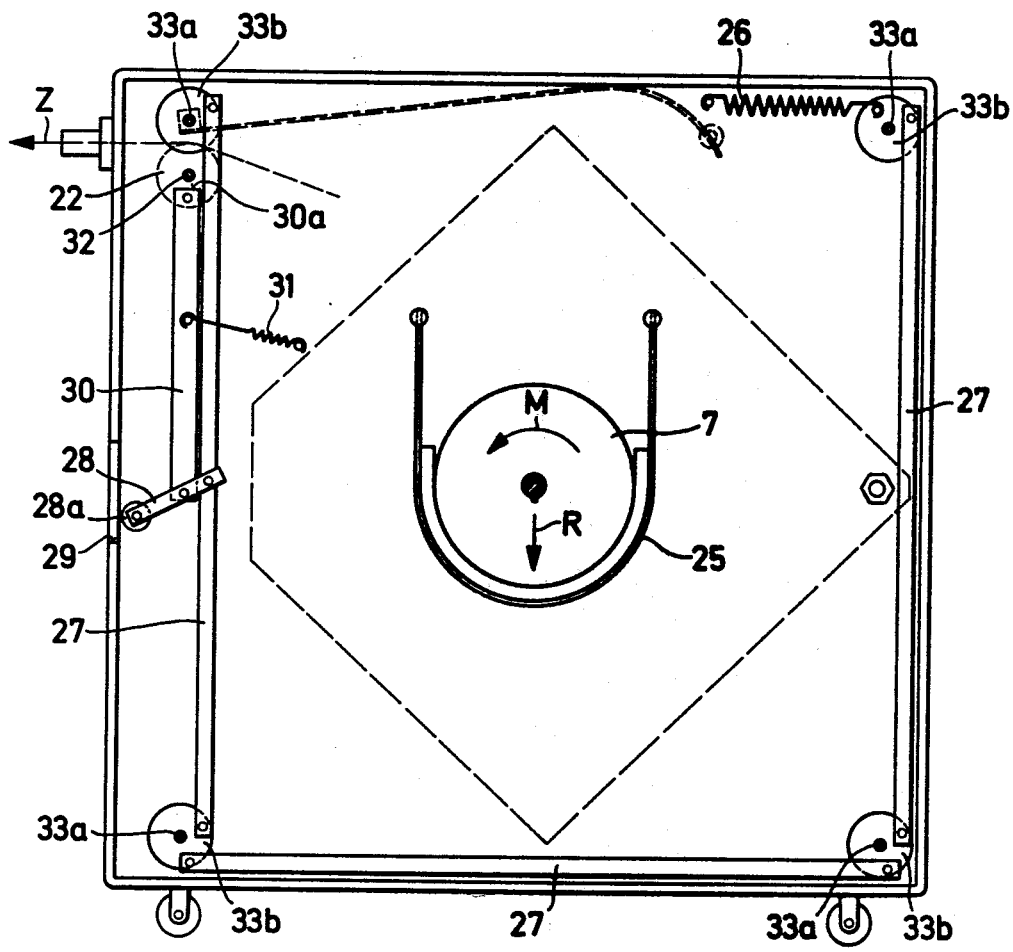
FIG. 3 is a view from the side opposite to the cover and with the outer wall removed.

Pivotally connected substantially to the centre of the vertical thrust rod 27 near the cassette opening 29 (FIG. 3) is an actuating lever 28 to which a bearing or support rod 30 is pivotally connected. A restoring spring 31 retains rod 30 in an initial position substantially parallel to the thrust rod 27 as shown in FIG. 3, the free end 30a of rod 30 bearing on the periphery of cam roller 32. An actuating wedge 39 provided on end wall 103 of the recess 102 of the printer 100 is introduced through the opening 29 of the cassette and engages a roller on the free end of lever 28.

The automatic winding-on system operates as follows:

Before the cassette is inserted in the printer, all elements are in the position shown in FIG. 3. During insertion the wedge 39 enters the cassette and engages roller 28a pivoting the lever 28 upwardly. Since rod 30 bears on cam roller 32, thrust rod 27 moves down against the force of spring 26 so that all the guide flaps 33 and the bar 21 (via a guide flap 33) pivot radially inwards into the operative position shown in FIG. 5. Also, and as previously described, the brake disc 7 is released from the brake band 25 and the pulley 8 engages the toothed belt 45 so that the hub 6 with its spool 17 starts to rotate.

A printing material strip 38 entering the opening 21a in the cassette from the opening 104 in the wall 103 of the printer moves over the stationary deflecting roller 22 and is guided by the flaps 33 towards and around the spool 17 which is arranged to run faster than the strip 38. The strip therefore tightens automatically on the spool 17 after one or two turns. The speed difference introduces tension in the strip so that the friction between the strip and the roller 22 increases causing the roller 22 to rotate. The cam roller 32 which rotates with the roller 22 moves rod 30 upwards out of its inoperative position against the tension of the restoring spring 26 past the cam roller 32. The flaps 33 then pivot back automatically into their initial position shown in FIG. 6. When the cassette is disengaged from the printer, the weight of the elements 28 and 30 and the tension in the spring 31 return them to their initial positions shown in FIG. 3.

For unwinding, the cassette is inserted at the supply side of the printer and the strip of photographic material is introduced into an opening in the printer. In this case the hub 6 is not driven and the brake disc 7 engages the brake band 28 as hereinbefore described so as to induce tension in the strip material drawn off the spool 17.

What is claimed is:

1. A cassette for strip material comprising:
   (a) a light tight casing defining an opening through which strip material is admitted to or drawn from the casing,
   (b) a door in the casing and within the casing,
      (1) a hub for receiving a spool for strip material,
      (2) means rotatably mounting said hub in said casing,
      (3) means for coupling said mounting means to a drive external to the casing,
      (4) a brake acting on said hub, said brake including a brake disc coupled to said hub and rotatable therewith and a brake band mounted on said casing and engageable with said brake disc, said means rotatably mounting said hub being adapted to move within said casing thereby disengaging said brake disc from said brake band; and
      (5) a brake release mechanism adapted to be actuated from outside the casing.

2. A cassette according to claim 1, wherein said means rotatably mounting said hub includes a shaft on which is mounted for rotation therewith, said hub and said brake disc and wherein the brake release mechanism includes a slider mounted on said shaft outside the cassette casing for engagement with means on a printer with which the cassette is to be used to move said shaft to disengage the brake disc from the brake band.

3. A cassette according to claim 2, wherein the slider is freely rotatable on said shaft.

4. A cassette according to claim 2 including a pivot extending inside the casing parallel to said shaft and wherein said means rotatably mounting said hub includes a carrier rotatably mounting said shaft, said carrier being movable about said pivot thereby disengaging said brake disc from said brake band.

5. A cassette according to claim 4, wherein said casing includes an internal partition and wherein said carrier comprises a support plate, which is substantially perpendicular to the shaft axis and pivotable in its own plane around said pivot, the support plate mounting rollers bearing against said internal partition.

6. A cassette according to claim 1 wheren said hub includes a radially adjustable clamping member to clamp a spool of printing material on said hub, and means adjusting the clamping member accessible at that end of the hub adjacent said door.

7. A cassette according to claim 6, wherein the clamping member adjusting means are engageable with the cover so that when the door is opened, the clamping member is moved radially inwards and when the cover is closed, the clamping member is moved radially outwards.

8. A cassette according to claim 1, including means for guiding on to and around the hub a printing material strip entering the casing through said opening.

9. A cassette according to claim 8, wherein the means for guiding the strip of printing material comprises: four guide flaps movable towards and away from the hub and wherein said operating means include means to move the guide flaps towards said hub.

10. A cassette according to claim 9, wherein the guide flap moving means comprise: a first restoring spring, a thrust rod movable against said first restoring spring from an inoperative into an operative position to move the guide flaps towards said hub; a second restoring spring; an actuating lever pivotally connected to the thrust rod; a cam roller; a support rod which is pivotally connected to the actuating lever and which said second restoring spring retains in an initial position substantially parallel to the thrust rod and against said cam roller; a freely rotatable deflecting roller for the printing material strip mounted adjacent said opening and rotatable with said cam roller, wherein rotation of the cam roller moves the support rod out of its normal position against the second restoring spring thereby disengaging from the cam roller and being moved together with the thrust rod by the force of the first restoring spring, as far as its inoperative position.

11. A cassette according to claim 10 including pivots which extend parallel to the hub and on which the guide flaps are mounted.

12. A cassette according to claim 10 including rollers mounted at the free ends of the guide flaps.

13. A cassette according to claim 10 wherein the actuating lever is a cam follower.

14. A cassette according to claim 1 wherein the coupling means for coupling the hub to an external drive is a pulley.

15. A printer having a cassette receiving recess, a cassette for exposed printing material releasably docked in said receiving recess and a rotating drive; the cassette including a hub rotatably disposed in the cassette, complementary coupling means for coupling the hub to the rotating drive, a releasable brake acting on said hub, and means for automatically releasing the brake upon docking the cassette in the recess; said recess in the printer including guide bars, the material-receiving hub being vertically movable, and said brake including a brake band engageable with a brake disc rotating with the hub, the hub including a slider for moving the hub vertically when engaged by said guide bars provided in said recess.

* * * * *